Dec. 6, 1966     E. E. ERIKSSON ET AL     3,290,102
SPHERICAL ROLLER BEARING WITH BARREL-SHAPED ROLLERS
Filed Feb. 24, 1964

INVENTORS:
ERIK EDVIN ERIKSSON
VIKTOR SYNEK
BY Howson & Howson
ATTYS.

United States Patent Office 3,290,102
Patented Dec. 6, 1966

3,290,102
SPHERICAL ROLLER BEARING WITH BARREL-SHAPED ROLLERS
Erik Edvin Eriksson and Viktor Synek, Goteborg, Sweden, assignors to Aktiebolaget Svenska Kullagerfabriken, Goteborg, Sweden, a corporation of Sweden
Filed Feb. 24, 1964, Ser. No. 347,338
Claims priority, application Sweden, Mar. 5, 1960, 2,260/60
5 Claims. (Cl. 308—213)

This application is a continuation-in-part application of our prior application Serial No. 90,858, entitled, "Spherical Roller Bearing With Barrel-Shaped Rollers," filed February 21, 1961, and now abandoned.

The present invention relates to improvements in rolling bearing assemblies.

More particularly the present invention relates to an improvement in spherical roller bearings with barrel-shaped rollers and without side flanges on the inner ring, and having a massive roller cage comprising an annular portion having substantially axially directed fingers, the free ends of which are located radially outside of the roller pitch surface and axially outside of the greatest diameter of the rollers.

Roller bearings of the above mentioned type in which the pockets for the rollers have been formed by a drilling or milling operation in substantially axial direction of the pockets are known. This method of forming the pockets has, however, certain drawbacks. The rollers are not correctly guided since they engage the fingers which separate them from adjacent rollers only at a point or along a short line perpendicular to their axes. There is thus a risk that in the unloaded zone of the bearing where the roller is not guided by flanges or the like, it will skew and enter the loaded zone in a skewed position so that it must be brought into correct position by means of a guide ring or a flange, this causing a sliding action which results in increased wear. Another disadvantage with the drilled cages of known type is that in flangeless bearings they would not prevent the roller from shifting axially. For this reason, bearings with this type of cage are provided with flanges on the inner race ring which limit the axial shifting of the rollers.

The purpose of the present invention is to eliminate these disadvantages in spherical roller bearings having massive roller cages. This is attained thereby that the surfaces of the fingers of the cage turned towards the rollers conform substantially to the peripheral surface of the rollers.

The massive, one-piece cage of the present invention which may be machined from a solid blank has certain advantages over cages made of pressed sheet metal. In pressed sheet metal cages, it is a very simple matter to provide pockets for the rolling elements in any shape by using a suitably formed tool for stamping the openings for the pockets. However, pressed sheet metal cages do not possess the high degree of accuracy for guiding and supporting the rolling elements as compared with a massive, one-piece cage machined from a solid blank. In a machined cage in accordance with the present invention, the spacing and orientation of the fingers of the cage may be controlled more precisely than in a pressed sheet metal cage.

Two forms of the invention are described below with reference to the accompanying drawings, in which.

Figure 1:
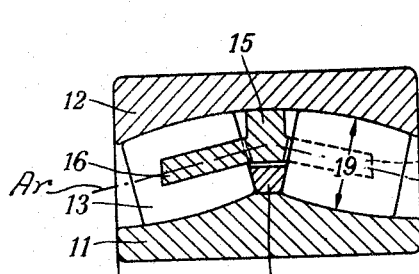
FIG. 1 is a section through a portion of a spherical roller bearing having a cage according to the invention centered in the outer race.
Figure 6:
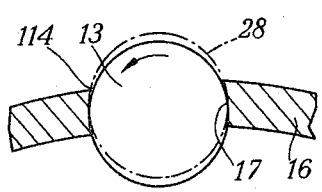

In FIG. 1, the numeral 11 designates the inner race ring of a double row spherical roller bearing of which 12 is the outer race ring and 13 is the barrel-shaped rollers of the bearing arranged in two rows and having between them a guide ring 14 centered on the central portion of the inner race ring. Radially outside of the guide ring 14 is a cage comprising an annular portion 15, the outer surface of which is spherical and centered in the spherical race of the outer race ring 12. In order to enable the cage to be inserted in the outer race ring 12, two diametrically opposed segments of the outer peripheral surface of the annular portion 15 have been removed as at 15a, 15a. Axially directed fingers 16 project from each side of the annular portion 15. In the present instance, the fingers 16 projecting from opposite sides of the annular portion are circumferentially spaced apart, and therefore the pockets 111 and 112 on opposite sides of the annular portion 15 are circumferentially offset. (See FIG. 8.) These fingers are parallel with the axes of rotation of the rollers and their surfaces 17 facing the rollers conform very nearly to the surface of the outer portions of the rollers as shown in FIG. 6. In other words, they conform to the portion of the rollers located outside of the pitch surface of the set of rollers, the pitch surface being a surface of revolution generated by a line $A_r$ (see FIGS. 1 and 2) through the axes of rotation of the rollers. In this manner the rollers 13 are retained against movement radially outwardly of the cage, so that the outer race ring 12 may be removed and the rollers maintained in place in the pockets by the fingers of the cage. This conformity between the surfaces 17 of the fingers 16 and the rollers, is attained by milling the pockets in a special manner. The fingers extend sufficiently past the greatest diameter 19 of the rollers in order to prevent the rollers 13 from shifting axially to any substantial degree when the outer race ring 12 is swung away from the plane of the inner race ring to open up the bearing for inspection. When assembling the bearing it is necessary to spread the fingers slightly to open up the gap 110 between the ends of the fingers to permit the rollers to be inserted into the pockets by snapping them axially into the pockets.

Figure 7:
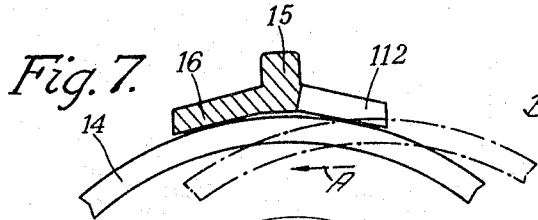
FIGS. 7 and 8 show how a guide ring of the bearing is inserted in the cage before it is assembled on the inner race ring of a roller bearing according to FIG. 1.
Figure 8:
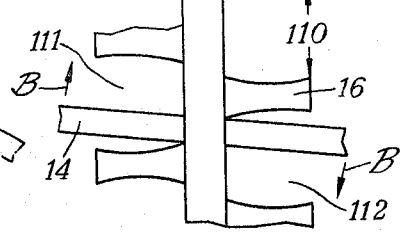
Figure 9:
FIG. 9 is a fragmentary side elevational view of the cage.

Since every finger is substantially parallel to the axes of its adjacent rollers, and thus the free end of the finger is closer to the center of the bearing than its root, it is necessary when inserting the guide ring 14 to proceed as shown in FIGS. 7 and 8. The guide ring 14 is inserted somewhat obliquely through two adjacent pockets 111 and 112 in each row and thereafter swung into position in the cage as indicated by the arrows in FIG. 8.

Figure 2:
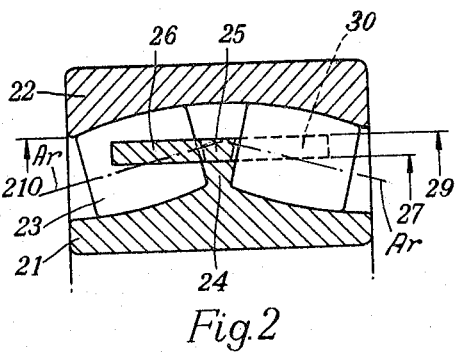
FIG. 2 shows another embodiment of cage in accordance with the present invention.

Another form of the invention is illustrated in FIG. 2. In this case, the numeral 21 designates the inner race ring of a spherical roller bearing, 22 is its outer ring and 23 the rollers. A fixed flange 24 on the inner race ring is located between the two rows of rollers. The cage 25 is made from a generally cylindrical tube having an internal diameter 27 slightly greater than the outer diameter of the guide flange 24, and an external diameter 29 which is smaller than the diameter 210 of the opening at the side face of the outer ring 22. The cage is centered on the guide flange 24. The cage has a plurality of circumferentially spaced, axially projecting fingers 26. The fingers 26 projecting from opposite sides of the center of the cage are circumferentially spaced apart so that the pockets formed by the fingers are circumferentially offset in the same manner as the embodiment of FIG. 1 described above. The fingers 26 have surfaces 30 facing the rollers which conform very closely to the surfaces of the outer portions of the rollers, and the fingers extend sufficiently past the greatest diameter of the rollers in order to prevent the rollers 23 from shifting axially to any substantial degree.

Figure 3:
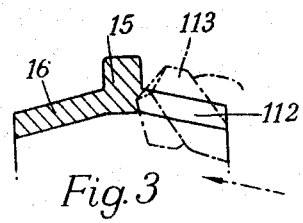
FIGS. 3, 4, 5 and 6 show diagrammatically how the roller pockets of a cage according to FIGS. 1 and 2 are made.
Figure 4:
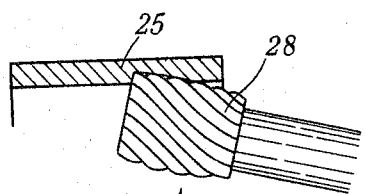
Figure 5:
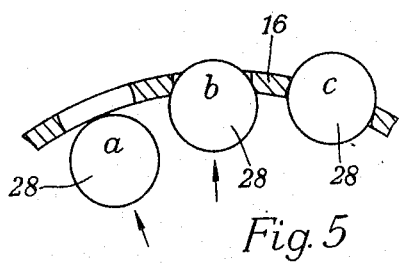

A cage according to FIGS. 1 and 2 can be made in various ways, for instance by die casting to approximately finished shape and machining the pockets to the finished shape and size. This method is economical only when the bearings are manufactured in large series. In other instances, the cage may be machined from a solid blank. In smaller series the cage may more suitably be made in the manner shown diagrammatically in FIGS. 3, 5, and 6. The pockets are first drilled endwise, as shown in FIG. 3, with a drill 113 having a diameter somewhat less than the smallest diameter of a milling cutter 28, by means of which pockets are milled to finished shape and dimension. The profile and size of the milling cutter correspond substantially to the profile and size of the rollers 13 and during the milling operation the axis of rotation of the milling cutter is maintained parallel with the axis of the pertinent roller in the position which it assumes in the assembled bearing, and the cutter is fed substantially radially outwardly relative to the cage, and in a direction substantially perpendicular to its axis of rotation. In FIG. 5, a and b show two different positions of the cutter during the milling operation, while c shows the extreme outward position of the cutter after which it is returned to the position a. It is preferable to feed the cutter 28 slightly past the position which the roller 13 assumes in the assembled bearing, as indicated in FIG. 6. This facilitates the assembly of the bearing and also improves the lubrication between the roller and cage, since the lubricant is not scraped off by the edge 114 when the roller rotates in the direction of the arrow. FIG. 4 shows the milling of a pocket without the previous drilling operation.

In double row roller bearings of the self-aligning type such as that shown in the drawing, the load carrying capacity of the bearing may be increased by increasing its width. Thus, it is possible to lengthen the rollers thereby to increase their load carrying capacity. This increased load carrying capacity, however, results in greater stress on the cage. However, in accordance with the present invention where the cage is machined from a solid blank, the separating fingers may be extended and provide sufficient rigidity for effective roller guidance.

The best results for roller guidance are obtained with a cage of the type illustrated in FIG. 1. In this cage the fingers 16 are disposed so that their center lines coincide substantially with an imaginary conical surface containing the axes of the obliquely disposed rollers 13. The outer surfaces of the fingers 16 should also be located substantially on a conical surface in order to make it possible to introduce the cage into the outer bearing ring 12, the side opening of which decreases for a given outer diameter as the ring 12 is made broader. By so disposing the fingers 16 of the cage, the fingers do not have to be made too thin at their outer ends and the fingers 16 may still have a sufficiently large inner diameter at the central part of the cage to accommodate a guide ring 14 for the roller ends located between the rows of rollers 13. In the present instance, the inner surfaces of the fingers 16 are also located on an imaginary substantially conical surface. Since it is desirable to make the cross sectional height of the guide ring 14 as great as possible and since there should be only a small amount of play between its outer circular surface and the inner surface of the cage, the outer diameter of the guide ring 14 will be greater than that of the side opening of the cage.

In accordance with the present invention the bearing assembly of FIG. 1 is assembled by first positioning the guide ring 14 substantially in an axial major plane of the cage transverse to the plane of the annular portion 15 and then introducing the ring 14 into the cage parallel with or somewhat skewed with reference to said major plane through two roller pockets located one in each row separated by the annular portion 15 of the cage and in which the openings of the pockets overlap at least partially and then turning the guide ring 14 to a position in which the axis of the cage and the guide ring substantially coincide. Thereafter, the cage and guide ring 14 together are positioned around or within the bearing rings of the assembly.

More specifically, with respect to FIGS. 7 and 8, the guide ring 14 is introduced in position in the cage as illustrated in FIG. 7, by first passing the guide ring 14 [indicated by broken lines] through a pocket 112 in one row and in the direction of the arrow A through a pocket 111 in the other row until it reaches the position indicated by the solid lines. This position is indicated in FIG. 8 which shows that the guide ring 14 is in a somewhat skewed position with respect to the pockets 111 and 112. In this position, the guide ring is then turned in the direction of the arrows B so that its axis coincides substantially with that of the cage and lies in the plane of the annular portion 15.

The invention has been described with reference to a cage for double row bearing having a single cage common to both rows of rollers and having fingers extending in both directions from the middle portion. The invention is not limited, however, to this type of cage, but may also be applied to cages having fingers projecting from one side only of an annular portion, i.e., in cages for single row spherical roller bearings and for double row bearings having a separate cage for each row of rollers.

We claim:

1. In a spherical roller bearing having an outer race ring, an inner race ring without side flanges, a plurality of barrel-shaped rollers in the annular space between the inner and outer race rings, a massive, one-piece cage machined from a solid blank comprising an annular portion, a plurality of fingers projecting generally axially from said annular portion and circumferentially spaced apart to define pocket openings therebetween for the rollers and having a portion thereof located radially outside of the pitch surface of the set of rollers, said fingers having surfaces facing the rollers which conform to and engage along a major portion of the length of the surface of the rollers, and being of a length greater than one-half the axial length of the rollers whereby the rollers are retained against radial outward movement with respect to the cage and limited axial movement with respect to the cage.

2. A spherical roller bearing according to claim 1 wherein said fingers are parallel to the axes of rotation of the adjacent rollers.

3. A spherical roller bearing according to claim 1 wherein said fingers are parallel with the axes of rotation of the bearing.

4. In a spherical roller bearing having an outer race ring having a raceway, an inner race ring without side flanges, a plurality of barrel-shaped rollers in the annular space between the inner and outer race rings, a massive, one-piece cage machined from a solid blank comprising an annular portion, a plurality of fingers projecting generally axially from said annular portion and circumferentially spaced apart to define pocket openings therebetween for the rollers and having a portion thereof located radially outside of the pitch surface of the set of rollers, said fingers being of a length greater than one-half the axial length of the rollers and having surfaces facing the rollers which conform to and engage along a major portion of the length of the surface of the rollers whereby the rollers are retained against radial outward movement relative to the cage and limited axial movement relative to the cage, said annular portion projecting radially outwardly beyond said fingers to provide a guide ring adapted to engage the raceway of the outer race ring to thereby locate the cage with respect thereto.

5. A spherical roller bearing as claimed in claim 4, wherein said fingers project from opposite sides of said annular portion and are circumferentially spaced apart to provide circumferentially offset pockets on opposite sides of said annular portion.

References Cited by the Examiner

UNITED STATES PATENTS

| | | | |
|---|---|---|---|
| 2,125,648 | 8/1938 | Palmgren | 308—214 |
| 2,375,145 | 5/1945 | Styri | 308—218 |

DAVID J. WILLIAMOWSKY, *Primary Examiner.*

FRANK SUSKO, *Examiner.*